Oct. 10, 1933.                D. HILGENBERG                1,930,359
                              ILLUMINATED SIGN
                              Filed Nov. 30, 1931
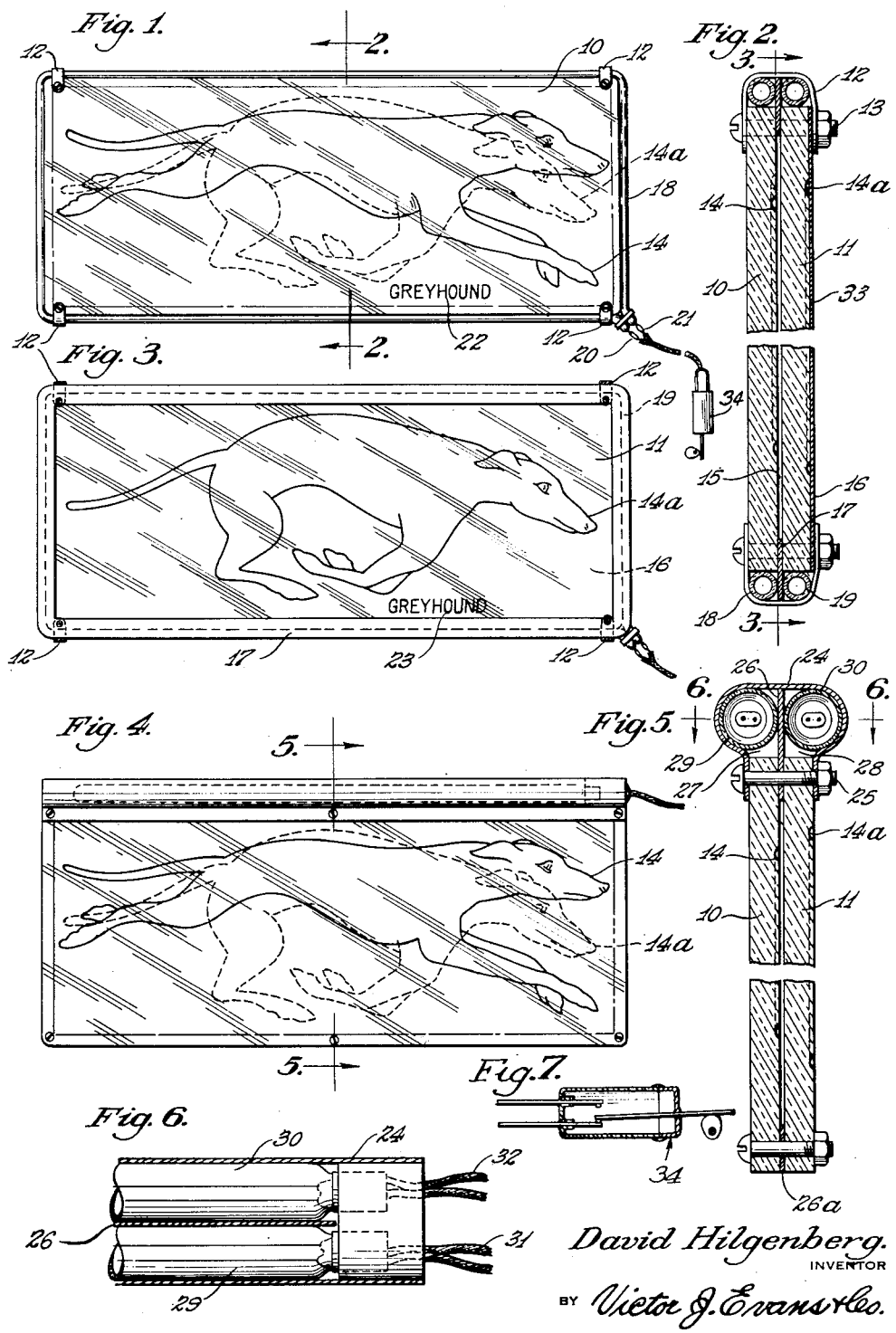
David Hilgenberg.
INVENTOR
BY Victor J. Evans & Co.
HIS ATTORNEYS Patented Oct. 10, 1933

1,930,359

UNITED STATES PATENT OFFICE 1,930,359

ILLUMINATED SIGN

David Hilgenberg, Chicago, Ill.

Application November 30, 1931
Serial No. 578,131

1 Claim. (Cl. 40—130)

This invention relates to certain novel improvements in illuminated signs, and has for its principal object the provision of an improved construction of this character which will be highly efficient in use and economical in manufacture.

It is an object of this invention to provide a new and novel illuminated electric sign.

This invention relates to an illuminated sign upon which the configuration of an object is inscribed and it is an object of the invention to provide new and novel means for imparting to the object the simulation of movement of animation; that is, to make it appear by deception to an observer that the object is moving.

Other objects will appear hereinafter.

The invention consists in the novel combination and arrangement of parts to be hereinafter described and claimed.

The invention will be best understood by reference to the accompanying drawing, showing the preferred form of construction and in which:

Fig. 1 is a front elevational view of a preferred embodiment of the invention;

Fig. 2 is a sectional view on line 2—2 in Fig. 1;

Fig. 3 is an elevational view, partly in section, on line 3—3 in Fig. 2;

Fig. 4 is a front elevational view of a modification of the invention;

Fig. 5 is a sectional view on line 5—5 in Fig. 4;

Fig. 6 is a fragmentary sectional view on line 6—6 in Fig. 5; and Fig. 7 is a sectional detail view of a circuit maker and breaker associated with the invention.

Referring to Figs. 1 to 3 inclusive, which illustrates a preferred and practical embodiment of the invention, 10 and 11 indicate a pair of light penetrable plates joined together by suitable means such as the brackets 12 and bolts 13. The configuration of an object 14 is suitably inscribed, by sandblasting, in the rear face 15 of the front plate 10 and the configuration of a similar object 14a is likewise inscribed, as by sandblasting, in the rear face 16 of the rear plate 11.

The marginal edges of the inner faces of the plates 10 and 11 are separated by an opaque strip 17 and circumscribing the plates 10 and 11 respectively, at opposite sides of the strip 17, are luminescent gas or vapor conducting tubes 18 and 19 to which are connected suitable electrical conductors 20 and 21.

In circuit with each of the conductors 20 and 21 I arrange a suitable circuit making and breaking device, generally indicated at 34 whereby tube 18 is first rendered luminescent and, by edgewise illumination of the plate 10, the configuration 14 is rendered visible; the circuit to the tube 18 then being broken and circuit to tube 19 closed whereby the configuration 14a is rendered visible by edgewise illumination of plate 11 whereby it is made to appear to an observer that the object 14—14a is animated, since by reference to Fig. 1 it will be noted that the object 14 in plate 11 is in a different position or posture than the same object 14 in plate 10. While the circuit maker and breaker used may be of any suitable type, the one shown and indicated at 34 is particularly described and claimed in my copending application, Ser. No. 627,513, filed August 4, 1932.

Any desired advertising matter or indicia such as, for example, that indicated at 22 and 23 may be inscribed in the rear faces of the plates 10 and 11 in any suitable manner, as by sandblasting.

In reference to the modification illustrated in Figs. 4 to 6 parts similar to those hereinbefore described for the structure illustrated in Figs. 1 to 3 will be given the same reference numerals. In this form of the invention a housing 24 is mounted on the plates 10 and 11, as by bolts 25 and 26 and this housing is divided by an opaque strip 26 into two compartments 27 and 28 in which are arranged, respectively, electric light bulbs 29 and 30; a portion 26a of the opaque strip 26 extending around the marginal edges of the inner faces of the plates 10 and 11.

The bulbs 29 and 30 are connected by suitable conductors 31 and 32 to a circuit making and breaking device (not shown) whereby the plates 10 and 11 will be alternately illuminated edgewise and the object 14—14a alternately rendered visible in the plates 10 and 11 to make it appear to an observer that the object is animated or moving.

The object 14—14a selected to illustrate the invention is, of course, only an arbitrary choice and any other object, indicia, or advertising matter may be used with the same novel effect.

The invention functions satisfactorily in both light and dark places but to obtain the best results where the intensity of the light is relatively great I prefer to provide an opaque backing 33 on the rear face of the plate 11, though it is to be understood that the invention includes the use of the two plates with opaque backing (Figs. 1 and 2) or without the backing (Figs. 4 and 5).

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

An illuminated sign comprising a pair of light penetrable plates having their inner faces arranged in parallelism face to face, each of the plates having the permanent inscription of an object formed therein on its rear face and said inscriptions being formed in different positions in the plates on the rear faces thereof, electric illuminating elements arranged in parallelism along corresponding edges of said plates for edgewise illuminating the plates, an opaque parting strip separating said illuminating elements and having a portion thereof extended between said plates relatively narrow with respect to the length and width of the plates but extending around and coextensive with the marginal edges of the plates, an opaque backing strip arranged over and coextensive with the area of the rear face of one of the plates, and means for successively activating said illuminating elements so that the said inscriptions on the plates will be successively illuminated and the object thus appear to be animated by being shown in first one and then the other of its positions.

DAVID HILGENBERG.